United States Patent
Horst

(10) Patent No.: US 6,724,114 B2
(45) Date of Patent: Apr. 20, 2004

(54) DOUBLY SALIENT MACHINE WITH ANGLED PERMANENT MAGNETS IN STATOR TEETH

(75) Inventor: Gary E. Horst, Manchester, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/035,366

(22) Filed: Dec. 28, 2001

(65) Prior Publication Data

US 2003/0122439 A1 Jul. 3, 2003

(51) Int. Cl.$^7$ .................... H02K 23/04; H02K 21/24; H02K 21/26
(52) U.S. Cl. ............... 310/154.11; 310/154.22; 310/154.29
(58) Field of Search .......... 310/154.11, 154.12, 310/154.13, 154.21, 154.22, 154.28, 154.29, 156.53, 156.56

(56) References Cited

U.S. PATENT DOCUMENTS

| | | | | |
|---|---|---|---|---|
| 544,318 A | * | 8/1895 | Melzer | 337/289 |
| 2,968,755 A | | 1/1961 | Baermann | 318/254 |
| 3,417,295 A | | 12/1968 | Littwin | 317/123 |
| 3,567,974 A | | 3/1971 | Spingler | 310/46 |
| 3,671,787 A | * | 6/1972 | Herron | 310/154.11 |
| 4,048,531 A | | 9/1977 | Buess et al. | |
| 4,110,645 A | * | 8/1978 | Hendershot, Jr. | 310/154.07 |
| 4,241,274 A | * | 12/1980 | Brammerlo | 310/259 |
| 4,348,605 A | | 9/1982 | Török | |
| 4,516,046 A | * | 5/1985 | Mercier | 310/154.11 |
| 4,713,570 A | | 12/1987 | Mastromattei | 310/154 |
| 4,794,290 A | * | 12/1988 | Nagasaka | 310/90.5 |
| 5,097,166 A | | 3/1992 | Mikulic | 310/156 |
| 5,117,144 A | * | 5/1992 | Torok | 310/269 |
| 5,327,069 A | | 7/1994 | Radun et al. | 322/10 |
| 5,444,318 A | | 8/1995 | Stumpf | 310/77 |
| 5,554,900 A | | 9/1996 | Pop, Sr. | |
| 5,672,925 A | | 9/1997 | Lipo et al. | |
| 5,825,112 A | | 10/1998 | Lipo et al. | |
| 5,825,113 A | | 10/1998 | Lipo et al. | |
| 5,920,139 A | * | 7/1999 | Fujiwara et al. | 310/154.11 |
| 6,081,083 A | | 6/2000 | Nashiki | |
| 6,262,508 B1 | * | 7/2001 | Shibayama et al. | 310/181 |

FOREIGN PATENT DOCUMENTS

| | | | |
|---|---|---|---|
| DE | 29 47 670 A1 | 7/1981 | H02K/23/04 |
| EP | 0 618 818 A1 | 6/1994 | H02K/19/06 |
| GB | 1 598 257 | 9/1981 | H02K/1/00 |
| JP | 10-28356 | 1/1998 | H02K/15/03 |

OTHER PUBLICATIONS

Copy of International Search Report from PCT/US02/41092 (Apr. 30, 2003).

* cited by examiner

*Primary Examiner*—Tran Nguyen
(74) *Attorney, Agent, or Firm*—Harness, Dickey & Pierce, P.L.C.

(57) ABSTRACT

Permanent magnet machines including doubly salient machines having one or more permanent magnets located at least partly and preferably entirely within the stator teeth, thereby avoiding weakening of the stator structure while reducing acoustic noise. The magnets may be located in only a subset of the stator teeth, thereby lowering magnet material and manufacturing costs, and all such magnets may have north poles directed toward an interior of the machine, resulting in reduced cogging and negative torques with improved torque densities. The permanent magnets may also extend within the stator teeth on an angle or diagonal, thereby allowing use of magnets which are wider than the teeth themselves to produce greater flux. Further, a magnetizing device having a single coil may be used to simultaneously magnetize all the stator magnets with a common polarity.

14 Claims, 18 Drawing Sheets

DOUBLY SALIENT MACHINE WITH ANGLED PERMANENT MAGNETS IN STATOR TEETH

FIELD OF THE INVENTION

The present invention relates generally to electric machines, and more particularly to doubly salient machines having stator teeth with angled permanent magnets therein.

BACKGROUND OF THE INVENTION

A variety of permanent magnet machines, including doubly salient machines, are known in the art in which permanent magnets are positioned within the frame or back iron of a stator. This is typically done to accommodate relatively large magnets capable of producing significant flux. As recognized by the inventor, however, positioning magnets in the stator frame tends to weaken the stator structure, including along those portions where the stator teeth meet the stator frame, and often leads to acoustic noise problems. In many designs, permanent magnets are associated with each stator pole, often with an alternating polarity for each adjacent stator tooth. As recognized by the inventor, however, such a configuration requires an excessive number of permanent magnets as well as a relatively complex device for magnetizing the stator magnets, thus increasing the complexity and manufacturing cost of the permanent magnet machine.

SUMMARY OF THE INVENTION

In order to solve these and other needs in the art, the inventor hereof has succeeded at designing and developing permanent magnet machines, including doubly salient machines, having one or more permanent magnets located at least partly and preferably entirely within the stator teeth, thereby avoiding weakening of the stator back iron structure while reducing acoustic noise. In one embodiment, permanent magnets are located in only a subset of the stator teeth, thereby lowering magnet material and manufacturing costs. In another embodiment, all such magnets are oriented with their north poles facing inwardly (i.e., toward an interior of the machine), resulting in reduced cogging and negative torques with an improved torque density. The permanent magnets may also extend within the stator teeth on an angle or diagonal, thereby allowing use of magnets which are wider than the teeth themselves to produce greater flux. Further, a magnetizing device having a single coil may be used to readily and simultaneously magnetize all the stator magnets with a common polarity.

In accordance with one aspect of the present invention, a stator for use in a permanent magnet machine includes a frame having an outer peripheral edge and an inner peripheral edge extending about a central axis, a plurality of stator teeth each extending along a radial axis from the frame's inner peripheral edge toward the central axis, and at least one permanent magnet located at least partly within one of the stator teeth, wherein said one permanent magnet is oriented at an oblique angle relative to the radial axis along which said one of the stator teeth extends.

In accordance with another aspect of the invention, a stator for use in a permanent magnet machine includes a frame having an outer peripheral edge and an inner peripheral edge extending about a central axis, a plurality of permanent magnets each having inwardly facing north poles, a first plurality of stator teeth each extending along a radial axis from the frame's inner peripheral edge toward the central axis, and a second plurality of stator teeth extending from the frame's inner peripheral edge toward the central axis. Each of the first plurality of stator teeth has one of the permanent magnets located at least partly therein, while the second plurality of stator teeth each have no permanent magnets located therein. The first plurality of stator teeth are each positioned directly between two of the second plurality of stator teeth. The north poles of the permanent magnets are each oriented at an oblique angle relative to the radial axis along which its corresponding one of the stator teeth extends. Each permanent magnet and its corresponding one of the stator teeth has a width extending in a direction of rotation of a rotor when the rotor is mounted for rotation about the central axis. The width of each permanent magnet is greater than the width of its corresponding one of the stator teeth.

In accordance with a further aspect of the invention, a permanent magnet machine includes a stator of the type described herein.

In accordance with yet another aspect of the invention, a method is provided for magnetizing a stator of an electric machine having a plurality of stator teeth spaced about a central axis, and a plurality of magnets, using a magnetizing device which includes a post and a coil extending around a central axis. The method includes positioning the stator relative to the magnetizing device with the central axis of the stator generally parallel to the central axis of the coil, and with the post extending adjacent the plurality of stator teeth, and energizing the coil to induce flux through the post, through at least some of the stator teeth, and through at least some of the magnets to thereby magnetize at least some of the magnets.

While some of the principal features and advantages of the invention have been described above, a greater and more thorough understanding of the invention may be attained by referring to the drawings and the detailed description of preferred embodiments which follow.

BRIEF DESCRIPTION OF THE DRAWINGS

Corresponding reference characters indicate corresponding features throughout the several views of the drawings.

DETAILED DESCRIPTION OF PREFERRED EMBODIMENTS

Figure 1:
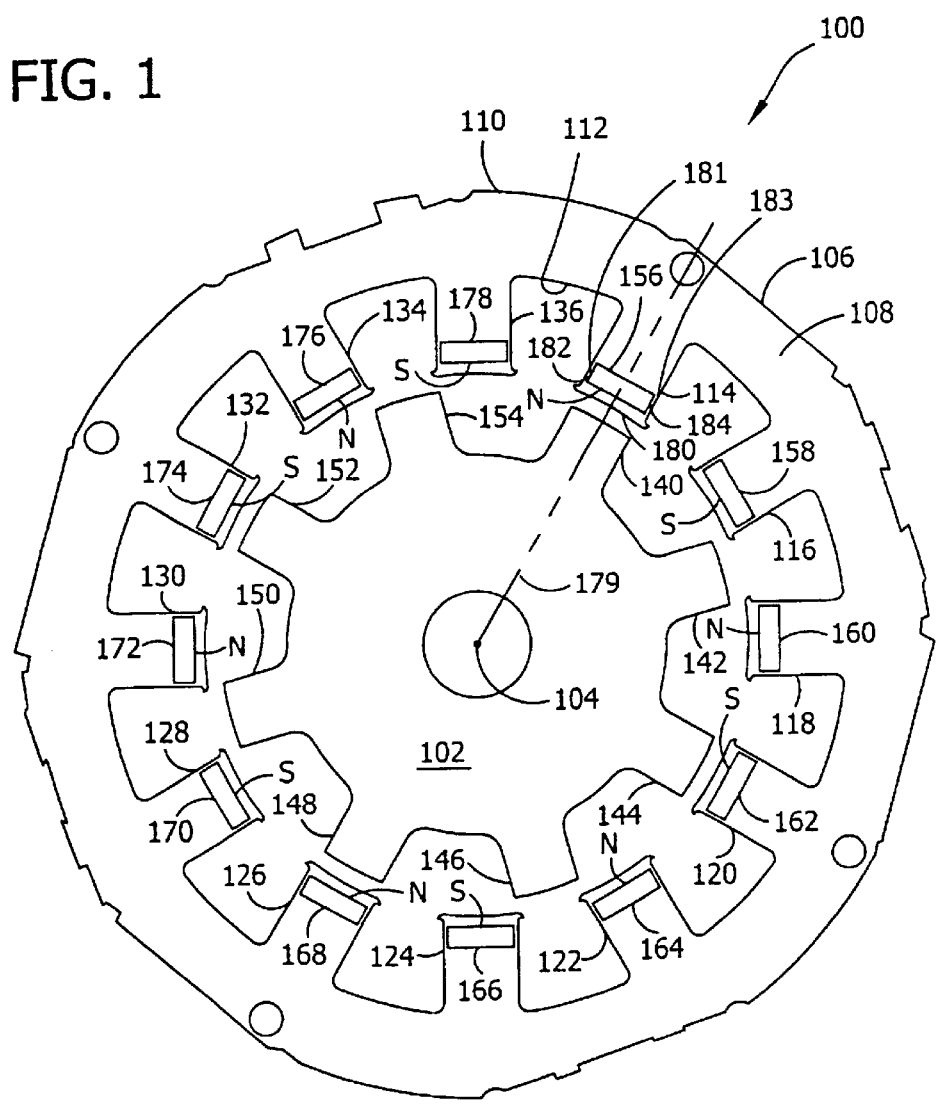
FIG. 1 is a cross-sectional view of a doubly salient machine according to one embodiment in which permanent magnets are positioned within the stator teeth.

A doubly salient machine according to one embodiment of the present invention is illustrated in FIG. 1 and indicated generally by reference character 100. As shown in FIG. 1, the machine 100 includes a rotating member/rotor 102 mounted for rotation about a central axis 104, and a stationary member/stator 106 extending about the rotor 102 in a magnetically coupled relation. The stator 106 includes a frame 108 (also referred to as the "back iron") having an outer peripheral edge 110 and an inner peripheral edge 112 extending about the central axis 104. The stator 106 also includes several salient stator poles/teeth 114–136 which extend from the inner peripheral edge 112 toward the central axis 104, and which are spaced at equal angular intervals around the central axis 104 to form an equal number of slots spaced at equal angular intervals around the central axis 104. The rotor 102 includes several salient rotor poles/teeth 140–154 which extend outwardly relative to the central axis 104, and which are spaced at equal angular intervals about the central axis 104, as shown in FIG. 1. The machine 100 is doubly salient in the sense that salient teeth are provided on both the rotor 102 and the stator 106.

Similar to the prior art, the stator teeth 114–136 each have a permanent magnet 156–178 associated therewith, with the permanent magnets alternating between north magnets (i.e., magnets having their north poles oriented toward the central axis 104) and south magnets (i.e., magnets having their south poles oriented toward the central axis 104) for each successive stator tooth, as shown in FIG. 1. Exemplary permanent magnet 156, like the other permanent magnets 158–178, is oriented at a generally perpendicular angle relative to a radial axis 179 along which its corresponding stator tooth 114 extends, and is preferably located adjacent to a distal end 180 of its corresponding stator tooth 114. Thin short circuit regions 181, 183 are preferably formed in the stator tooth 114 adjacent to ends 182, 184 of exemplary magnet 156. As is known, these regions 181, 183 are sufficiently thin (in a direction of rotation of the rotor 102, for the embodiment of FIG. 1) so as to minimize leakage flux and shorting of the exemplary magnet 156.

Unlike the prior art, the permanent magnets 156–178 of FIG. 1 are located entirely within the stator teeth, in contrast to being partially or entirely located within the frame 108. Positioning the permanent magnets 156–178 entirely within the stator teeth 114–136, rather than in the frame 108, strengthens the stator teeth where they meet the frame, especially in the case where the stator 106 employs a laminate construction. Positioning the permanent magnets in the stator teeth also raises their operating lines, especially when the salient poles of the rotor do not align with those of the stator, thus allowing the magnets to operate without demagnetizing, and provides additional coil space as well.

Figure 6:
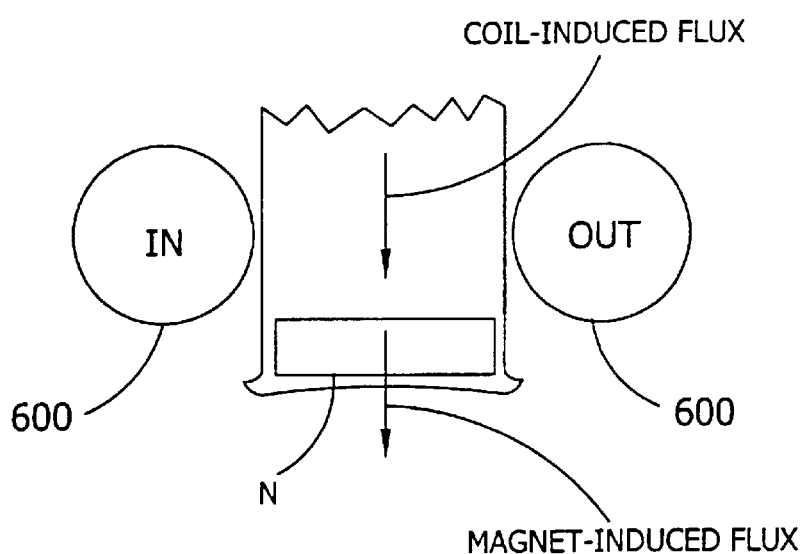
FIG. 6 illustrates an exemplary stator coil for the doubly salient machine of FIG. 4.

The machine 100 of FIG. 1 operates using reluctance torque for rotating the rotor 102, as is known. Although there are preferably no permanent magnets or coils on the rotor 102, appropriately energizing the stator coils (not shown in FIG. 1) induces a magnetic orientation in the stator 106 and in the rotor 102 (which is a ferromagnetic material) so as to maximize their flux condition, thereby causing alignment of stator and rotor poles via rotation of the rotor 102. A representative stator coil 600 is shown in FIG. 6, and is preferably excited such that it induces flux in the same direction as does its corresponding magnet (which, for the exemplary magnet shown in FIG. 6, is toward the central axis). A similar coil is preferably provided for each of the magnet-bearing stator teeth 114–136 shown in FIG. 1. These stator coils may be electrically connected in series, in parallel, or in a series-parallel arrangement as desired for any given application of the invention. The machine 100 can advantageously employ a unipolar drive (i.e., a drive employing only non-negative currents).

Figure 2:
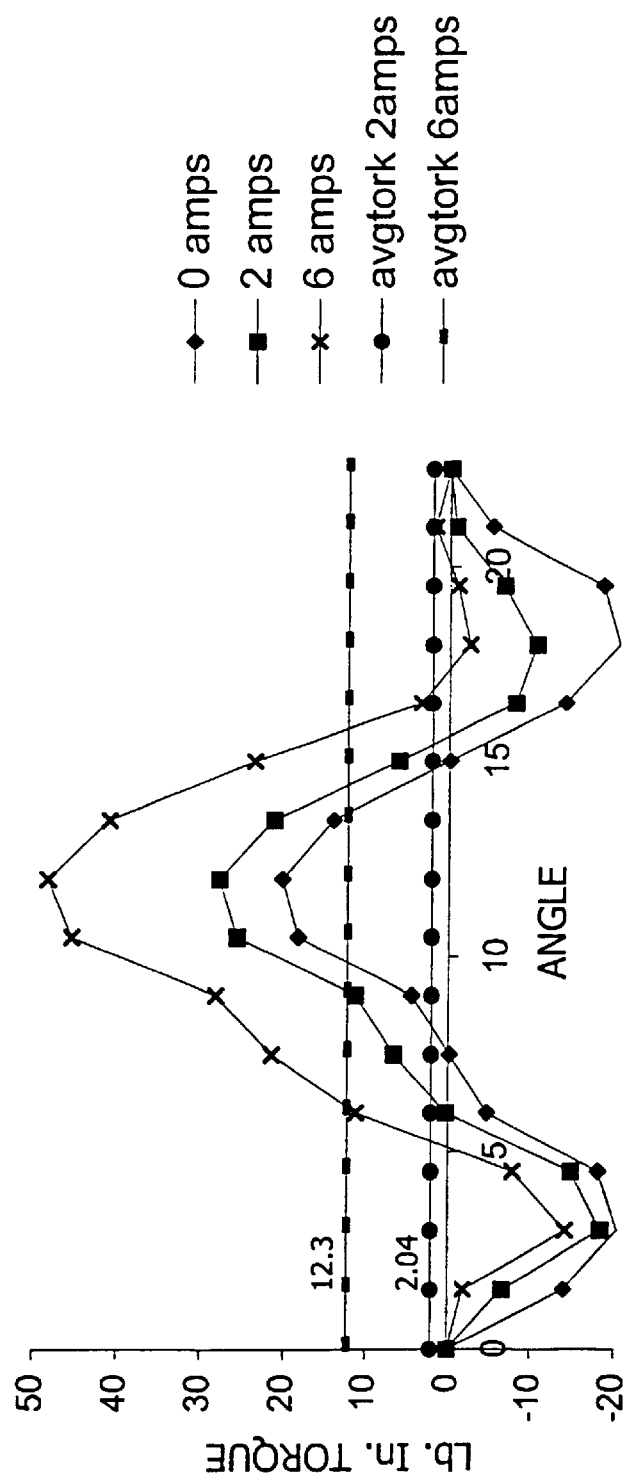
FIG. 2 illustrates torque curves for the doubly salient machine of FIG. 1.
Figure 3A:
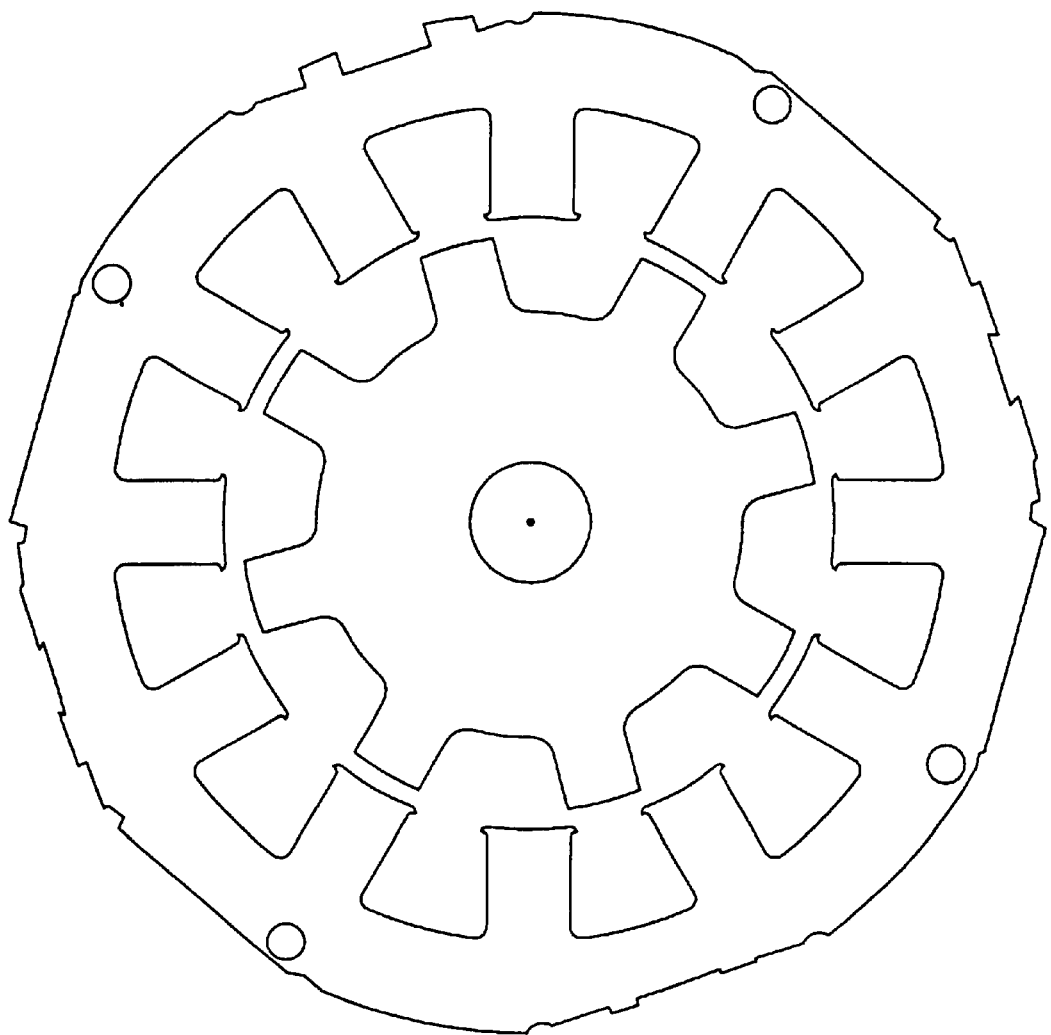
FIG. 3A illustrates a prior art switched reluctance motor having no stator magnets.
Figure 3B:
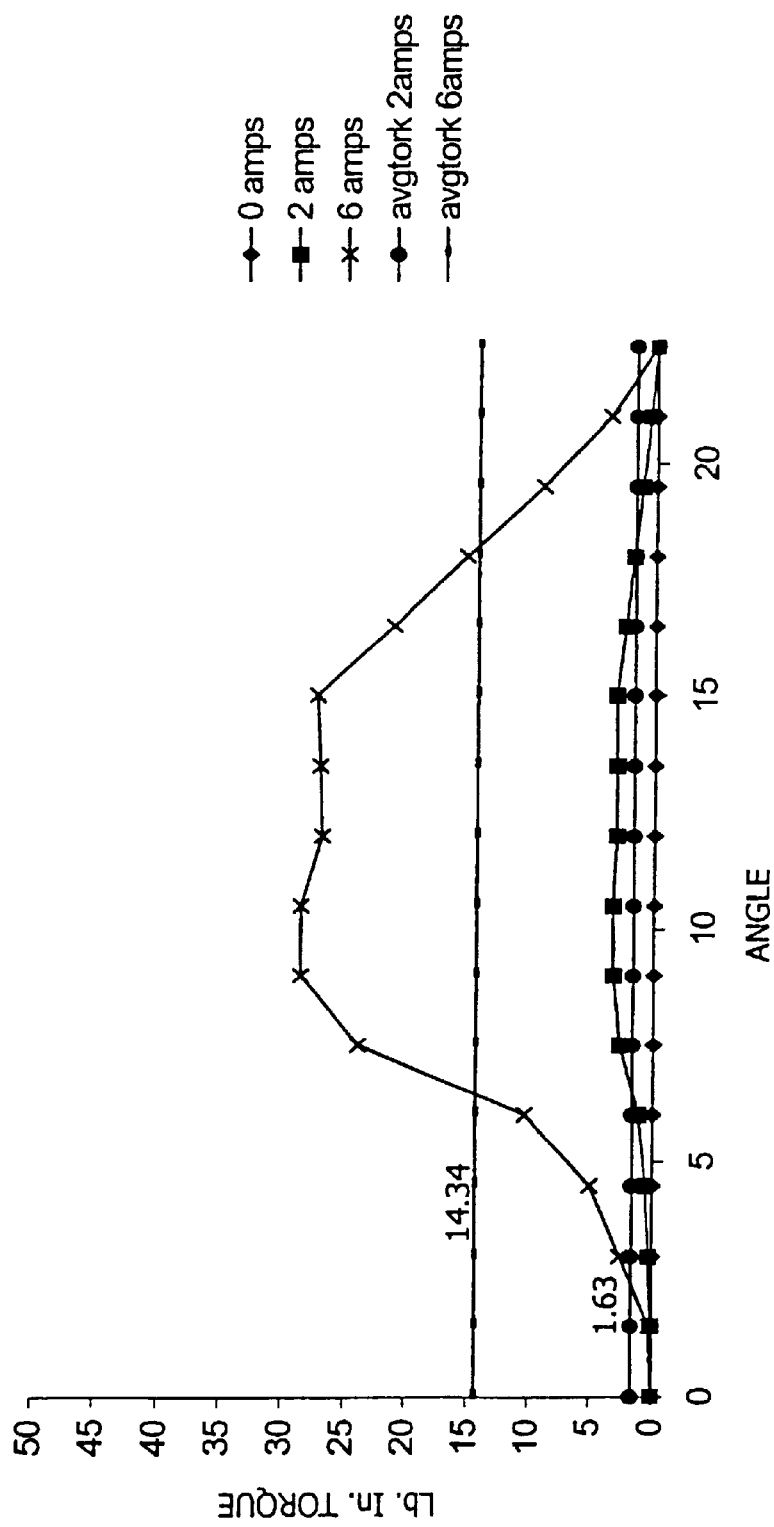
FIG. 3B illustrates a torque curve for the conventional switched reluctance motor of FIG. 3A.

FIG. 2 illustrates a series of torque curves for the machine 100 shown in FIG. 1 when driven by unipolar currents of zero, two and six amps. As shown in FIG. 2, the machine 100 produces significant negative torque at each current level, which obviously detracts from average torque levels. Nevertheless, average torque levels approximate those produced by a conventional switched reluctance motor of comparable size, shown in FIG. 3A, for which torque curves are provided in FIG. 3B.

Figure 4:
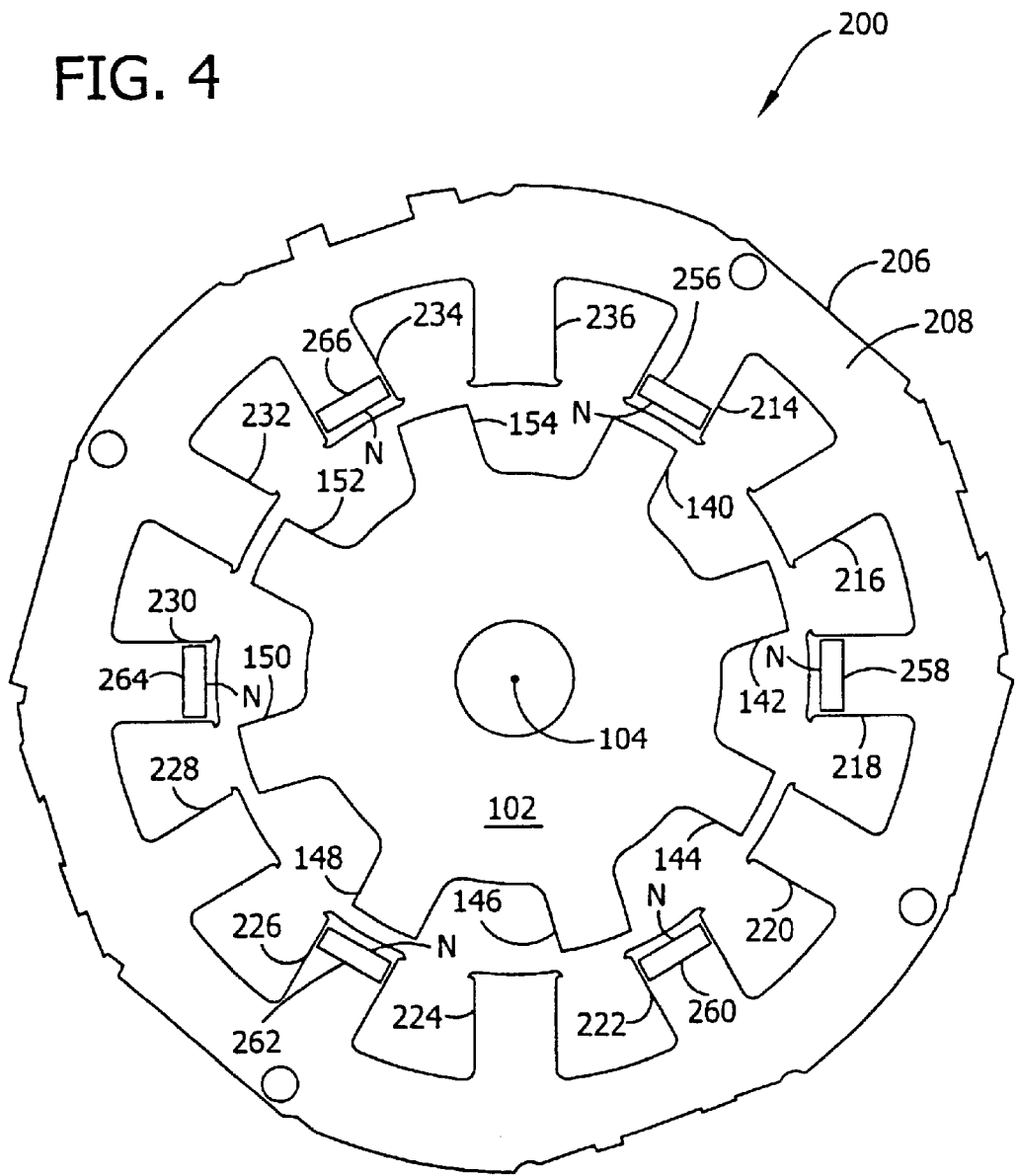
FIG. 4 is a cross-sectional view of a doubly salient machine having permanent magnets in only every other stator tooth.

FIG. 4 illustrates a doubly salient machine 200 according to another embodiment of the invention. Similar to the machine 100 shown in FIG. 1, the machine 200 includes a stator 206 having a frame 208 from which several salient stator teeth 214–236 extend, with north magnets 256–266 located entirely within every other stator tooth 214, 218, 222, 226, 230, 234. However, no magnets are positioned in the remaining stator teeth 216, 220, 224, 228, 232, 236. In other words, the machine 200 of FIG. 4 includes N stator teeth, and M magnets, where M and N are both integers, and where M<N and, more specifically, where M=N/2. Thus, the machine 200 contains only half the magnets of the machine 100 of FIG. 1, thereby reducing costs and simplifying construction. Further, by eliminating the south magnets 158, 162, 166, 170, 174, 178 employed in the machine 100 of FIG. 1, the machine 200 of FIG. 4 has a reduced cogging torque and reduced negative torque, thereby yielding an improved torque density. The machine 200 of FIG. 4 is also more readily magnetized, as further explained below. Like the machine 100 of FIG. 1, the machine 200 can advantageously employ a unipolar drive.

Figure 5:
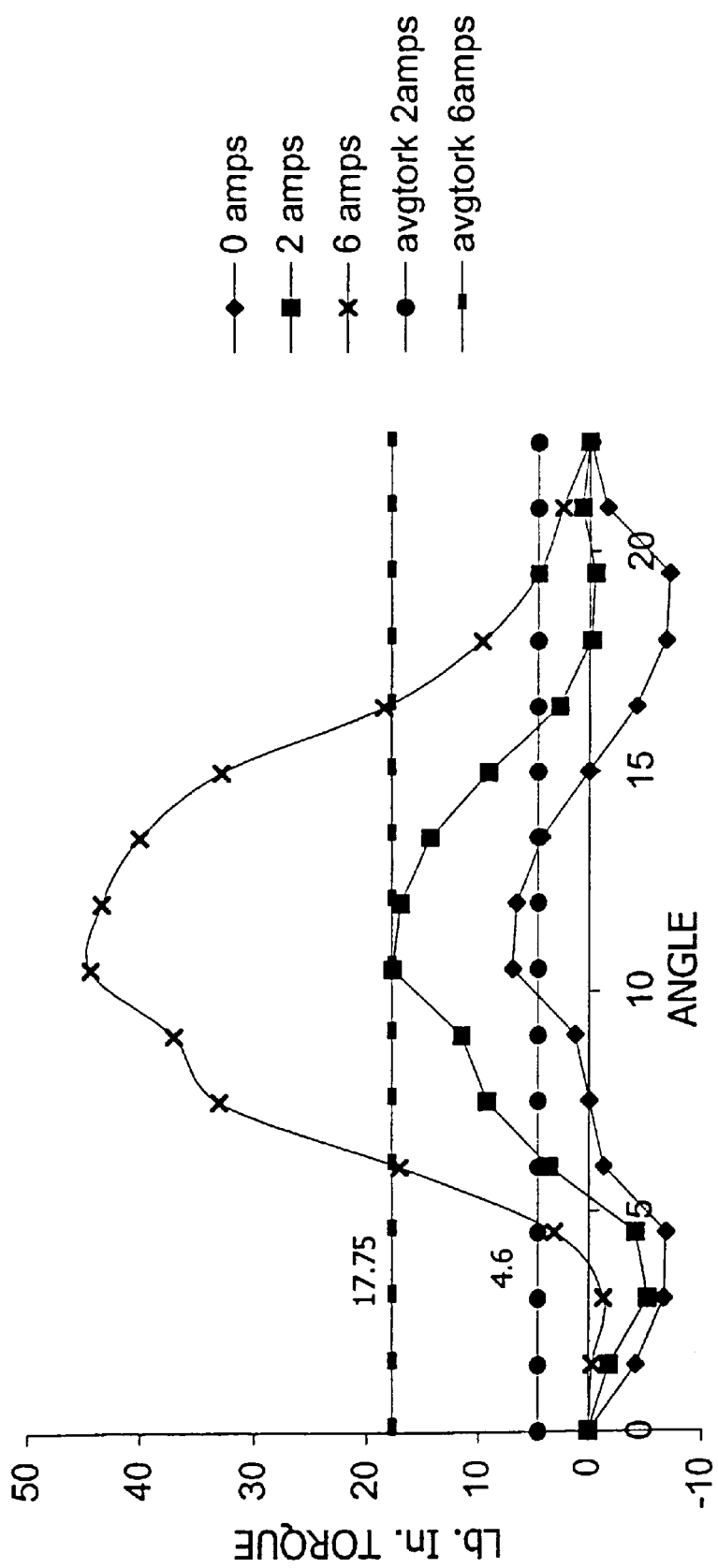
FIG. 5 illustrates torque curves for the doubly salient machine of FIG. 4.

FIG. 5 illustrates a series of torque curves for the machine 200 of FIG. 4 when driven by unipolar currents of zero, two and six amps. As shown in FIG. 5, the machine 200 produces average torque levels which are higher than those produced by the conventional switched reluctance motor of FIG. 3A, for which torque curves are provided in FIG. 3B. The machine 200 also produces significantly less negative torque than the machine 100 of FIG. 1, thereby enhancing average torque levels. As can be seen in FIG. 5, the machine 200 also produces significantly more positive torque than the machine 100 of FIG. 1.

Figure 7A:
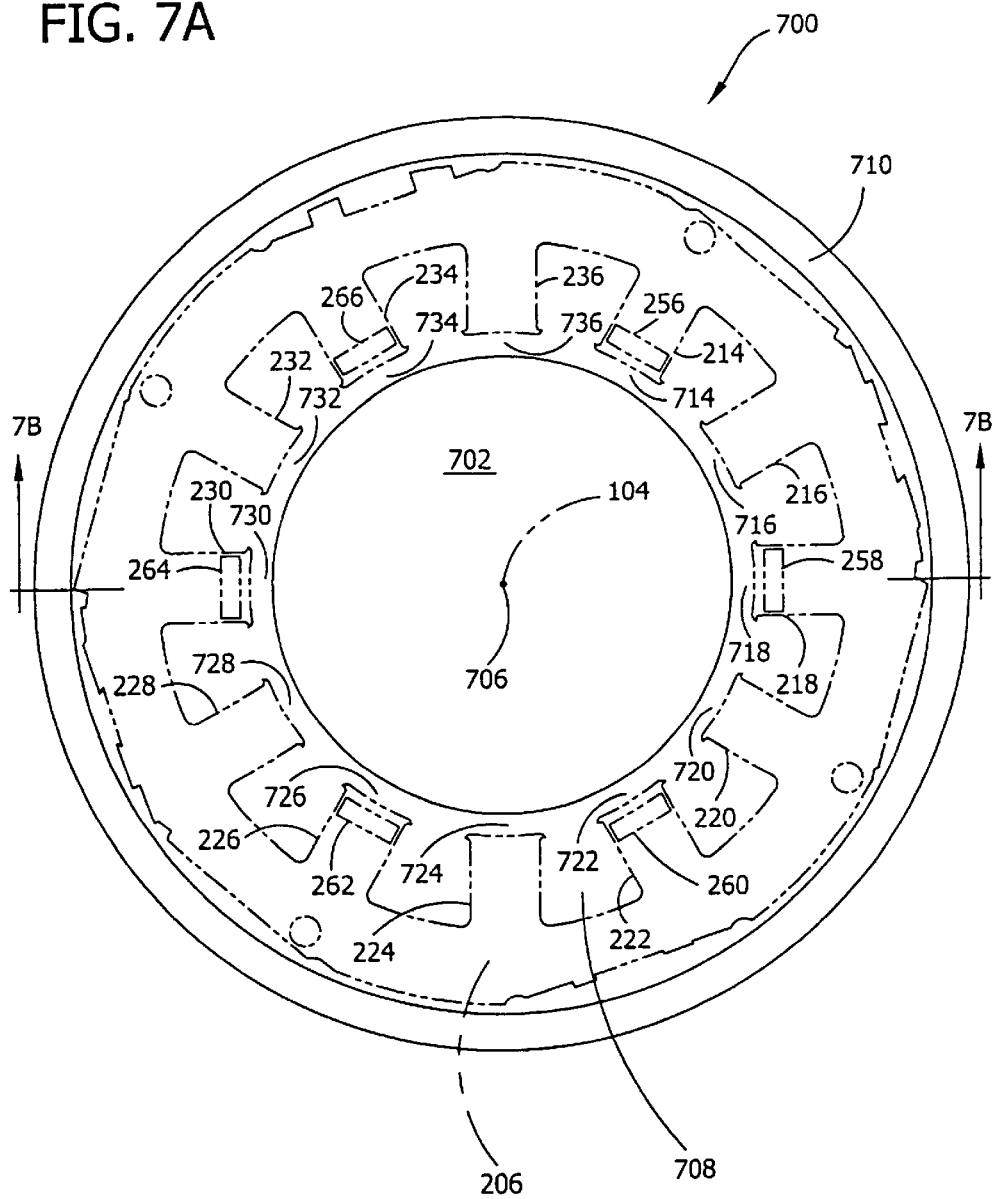
FIG. 7A illustrates a device for magnetizing the stator of FIG. 4.
Figure 7B:
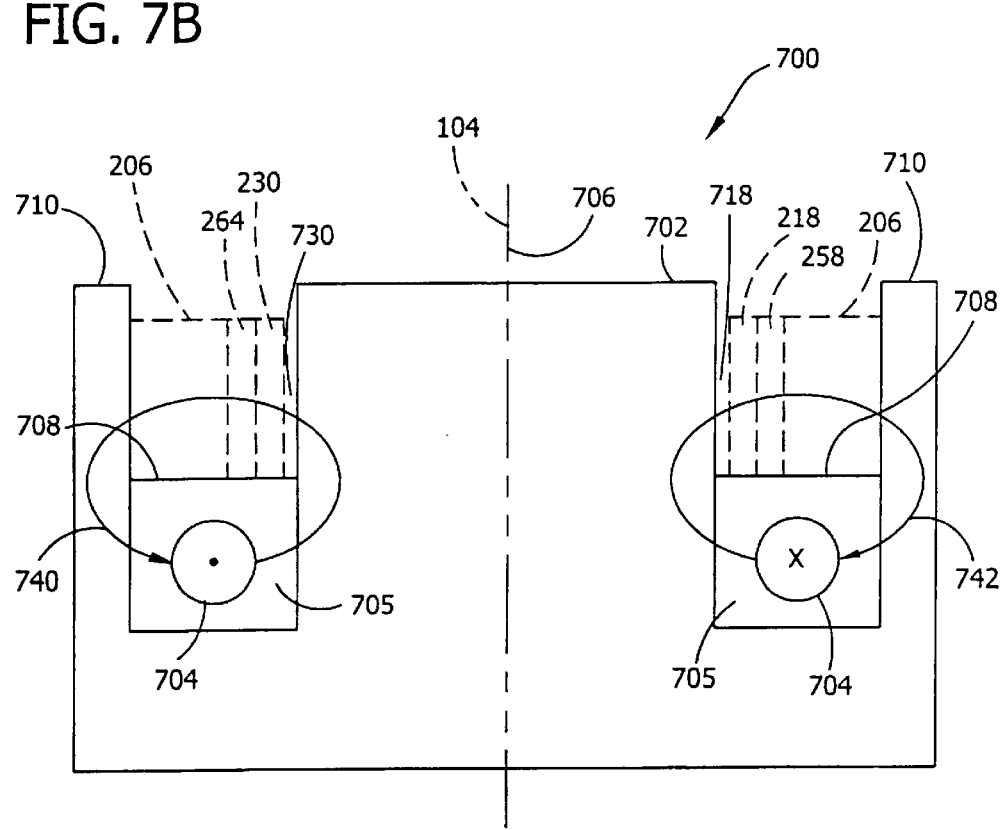
FIG. 7B is a cross-sectional view of the magnetizing device of FIG. 7A.

FIGS. 7A and 7B illustrate a preferred device 700 for magnetizing the stator 206 of FIG. 4. As best shown in FIG. 7B, the device 700 includes a preferably cylindrical post 702 and a single robust coil 704 extending about a central axis 706 and through a non-magnetic region 705 of the device 700. The device 700 preferably also includes a support surface 708 for supporting the stator 206 (shown in phantom), as well as an outer peripheral wall 710. To magnetize the magnets 256–266 in the stator 206, the stator is first positioned relative to the device 700 with the stator's central axis 104 generally parallel and, more preferably, coaxial with the central axis 706 of the coil 704, and with the post 702 extending adjacent to the stator teeth 214–236, preferably with the stator 206 supported by the support surface 708, as best shown in FIG. 7B. The single coil 704 is then energized, thus inducing flux to pass up through the post 702, across air gaps 714–736, through the stator teeth 214–236 (including through the magnets 256–266), down through the outer peripheral wall 710, and back to the single coil 704, as indicated generally by arrows 740, 742 in FIG. 7B (assuming the coil 704 is energized so as to effectively render the post 702 a north pole; otherwise, the direction of arrows 740, 742 would be reversed). In this manner, the magnets 256–266 in the stator 206 can be readily and simultaneously magnetized with a common polarity. The device of FIG. 7 may also be used to magnetize stators according to other embodiments of the invention, including those described below with reference to FIGS. 8–11.

Figure 8:
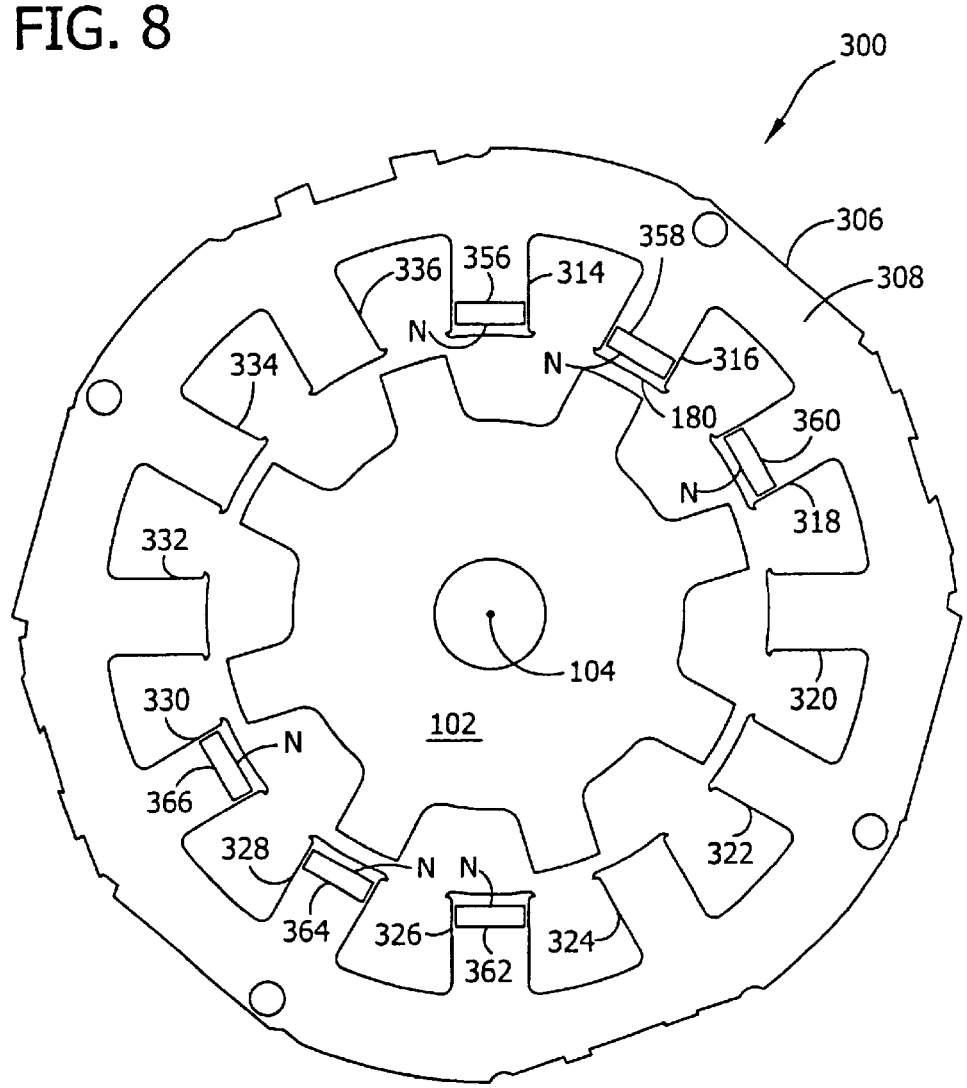
FIG. 8 is a cross-sectional view of a doubly salient machine having north magnets in several adjacent stator teeth.

FIG. 8 illustrates a machine 300 according to another embodiment of the invention in which only north magnets 356–366 are employed. As shown therein, three adjacent stator teeth 314–318 each have north magnets 356–360 located entirely therein, followed by three stator teeth 320–324 having no permanent magnets, and so on. Though suitable for certain applications, the machine 300 of FIG. 8 produces more torque ripple, a higher cogging torque and less torque density than the machine 200 of FIG. 4.

Figure 9:
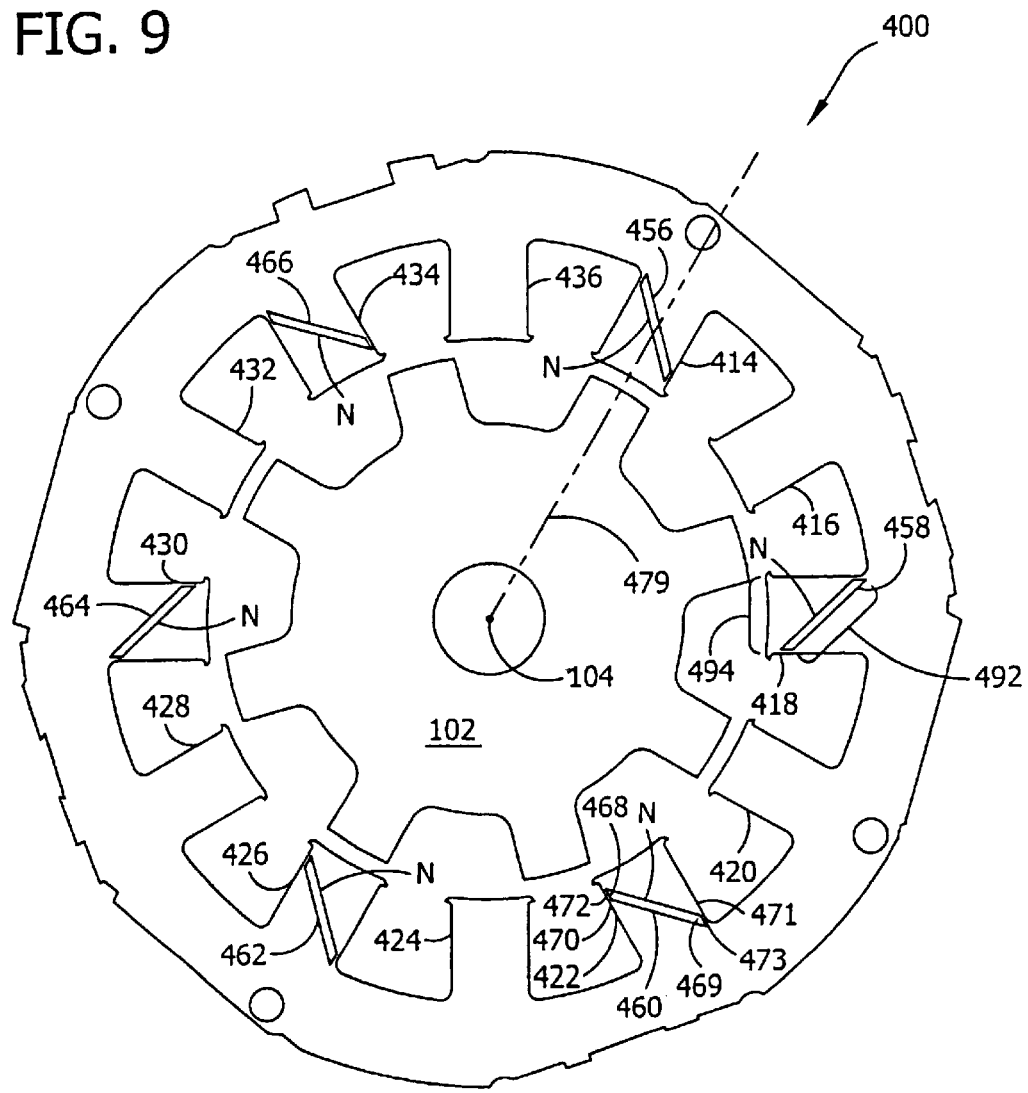
FIG. 9 is a cross-sectional view of a doubly salient machine having permanent magnets extending diagonally within stator teeth.

FIG. 9 illustrates a doubly salient machine 400 according to another embodiment of the invention. The machine 400 is much like the machine 200 of FIG. 4, in that north magnets 456–466 are positioned entirely within every other stator tooth 414, 416, 422, 426, 430, 434 with no magnets provided in intervening stator teeth 416, 420, 424, 428, 432, 436. However, exemplary magnet 456, like the other permanent magnets 458–466, has its north pole oriented at an oblique (i.e., non-perpendicular) angle relative to the radial axis 479 along which its corresponding stator tooth 414 extends. This allows wider magnets to be employed in the stator teeth, as compared to the magnets employed in the machine 200 of FIG. 4. Thus, as shown in FIG. 9, exemplary magnet 458 has a width 492 that is greater than a width 494 of the corresponding stator tooth 418 in which it is located. Consequently, the magnets 456–466 employed in the machine 400 of FIG. 9 have more surface area than the magnets 256–266 employed in the machine 200 of FIG. 4, allowing them to produce more flux. At the same time, the magnets 456–466 are still positioned entirely within the stator teeth 414, 418, 422, 426, 430, 434, as shown in FIG. 9, so as to avoid the disadvantages associated with magnets extending in the frame. With reference to another exemplary magnet 460, note that its ends 468, 469 are generally parallel to sides 470, 471 of its corresponding stator tooth 422, with thin short circuit regions 472, 473 provided between the ends 468, 469 and the sides 470, 471.

Figure 10:
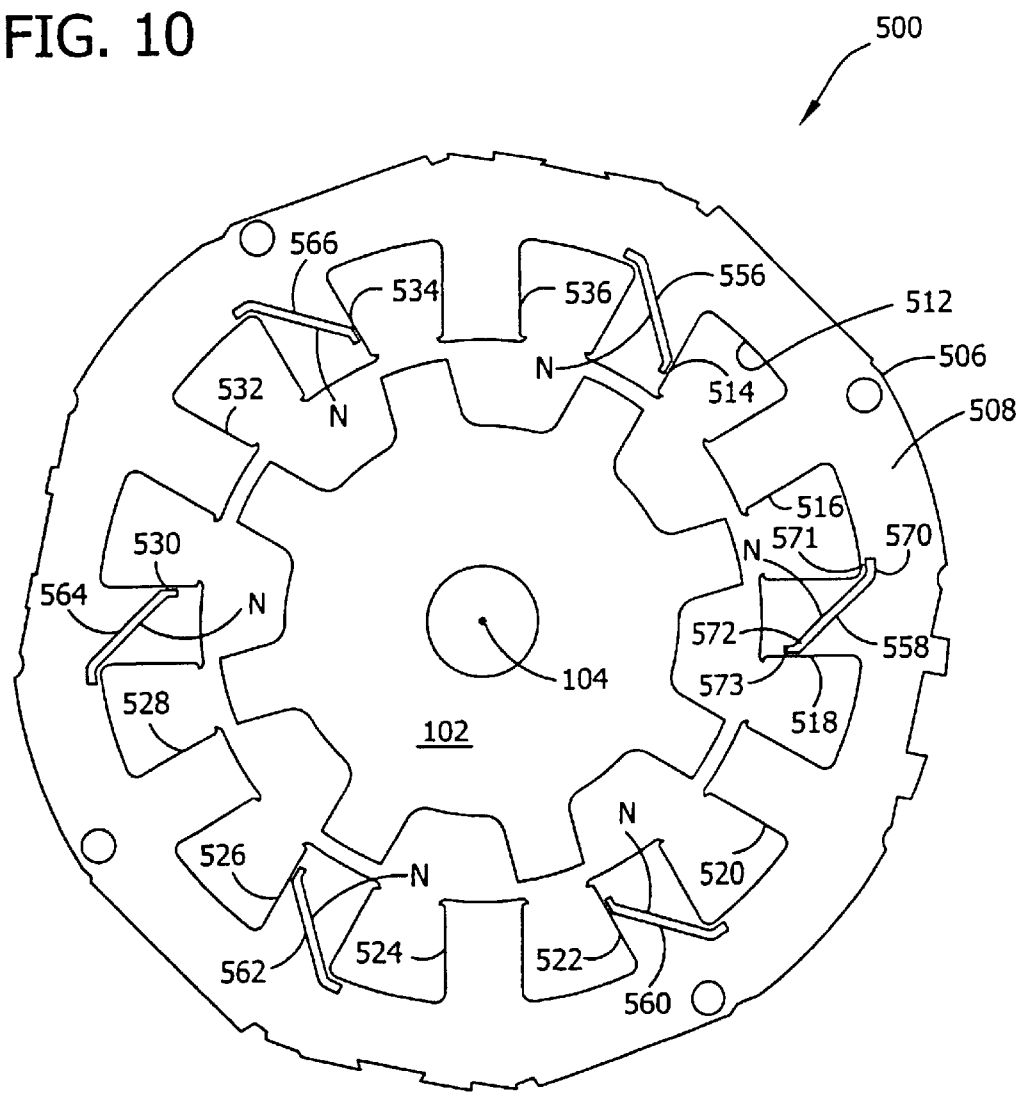
FIG. 10 illustrates one alternative to the machine of FIG. 9 in which the permanent magnets extend into the stator frame.

FIG. 10 illustrates a doubly salient machine 500 according to another embodiment of the invention in which magnets 556–566 extend from within stator teeth 514, 518, 522, 526, 530, 534 into frame 508 such that the surface area of the magnets 556–566 is further increased, as compared to the magnets 456–466 of FIG. 9, with a further increase in produced flux. Note that, in FIG. 10, one end 570 of exemplary magnet 558, which extends into the frame 508, is bent so as to form a thin short circuit region 571 between that end 570 of the magnet and the inner peripheral edge 512 of the stator 506. The other end 572 of the exemplary magnet 558 is also bent so as to form a short tip 573 which extends from the bend toward the central axis 104. This magnet configuration incrementally increases the surface area of the magnets 556–566, again increasing the amount of flux produced. However, because the magnets 556–566 of FIG. 10 extend partly into the frame 508, the strength of the stator teeth 514, 518, 522, 526, 530, 534 where they meet the frame 508 is reduced, and the amount of acoustic noise generated is increased, as compared to the machine 400 of FIG. 9.

Figure 11:
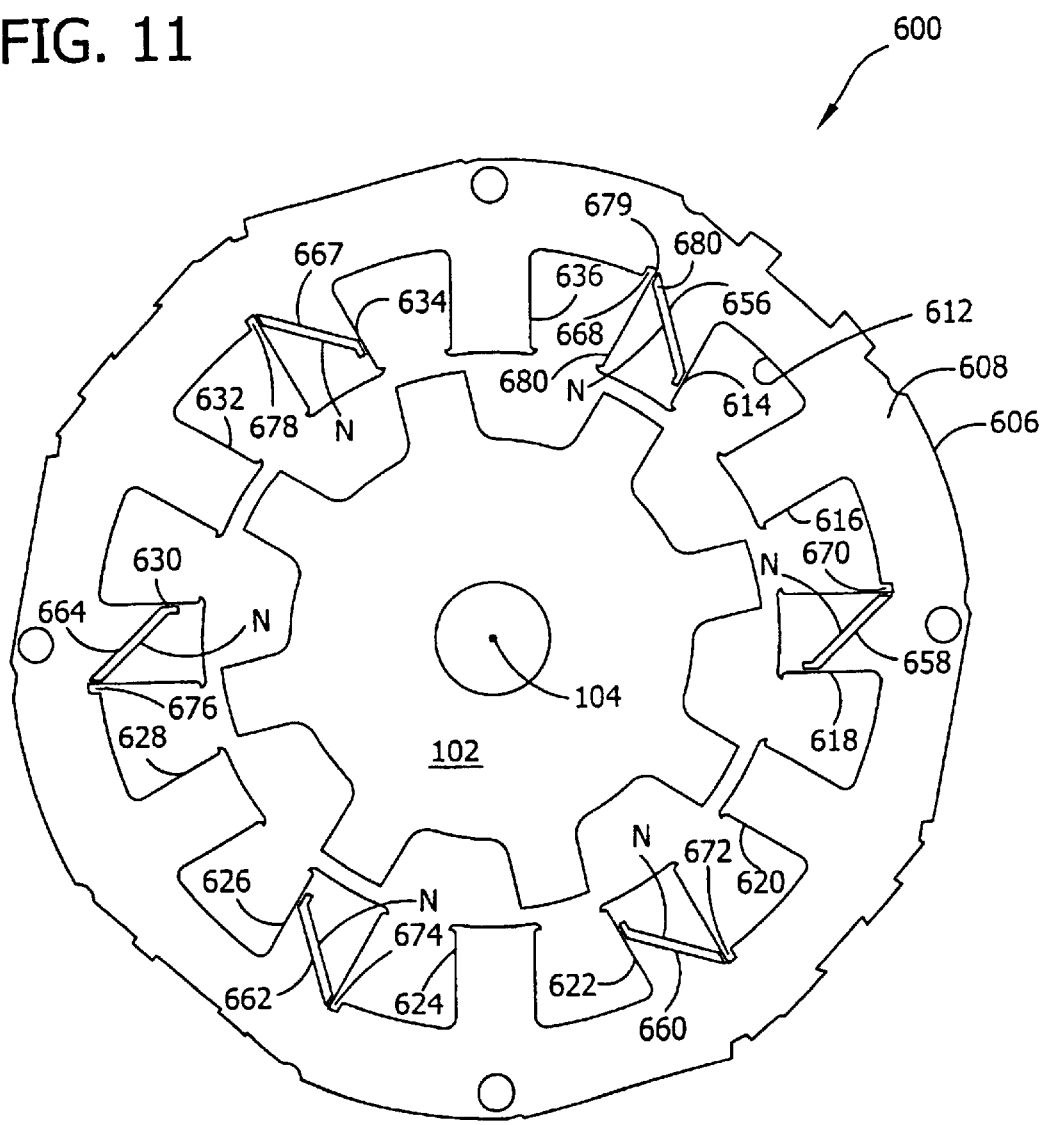
FIG. 11 illustrates another alternative to the machine of FIG. 9 in which notches are formed adjacent to one side of each magnet-bearing stator tooth.

FIG. 11 illustrates a doubly salient machine 600 according to still another embodiment of the present invention. This machine 600 incorporates the advantages of the machine 400 of FIG. 9, in which angled magnets are positioning entirely within the stator teeth, and the advantages of the machine 500 of FIG. 10, which employs magnets having greater surface areas than those of FIG. 9 at the expense of having such magnets extend into the stator frame 508. As shown in FIG. 11, notches 668–678 are provided adjacent to one side of each stator tooth 614, 618, 622, 626, 630, 634 in which a north magnet 656–667 is positioned. The notches 668–678 extend from the inner peripheral edge 612 of the stator 606 into the frame 608, and essentially increase the length of such stator teeth 614, 618, 622, 626, 630, 634 on one side thereof. This allows the magnets 656–667, which have a greater width than those of FIG. 9, to be employed while at the same time preventing such magnets from extending into the frame 608. Thus, the magnets 656–667 of FIG. 11 produce more flux than those of FIG. 9, but the machine 600 of FIG. 11 produces acoustic noise levels below those of the machine 500 of FIG. 10. Note that exemplary notch 668 forms a thin short circuit region 679 adjacent one end 680 of the exemplary magnet 656, which would otherwise (i.e., in the absence of the exemplary notch 668) extend into the stator frame 608.

Note that torque curves for the machines of FIGS. 9–11 are shaped generally the same as those shown in FIG. 5 for the machine 400 of FIG. 4. However, the positive and negative torque levels for the machines of FIGS. 9–11 are somewhat greater than those of FIG. 5 due to the increased magnet areas employed in FIGS. 9–11.

Figure 12:
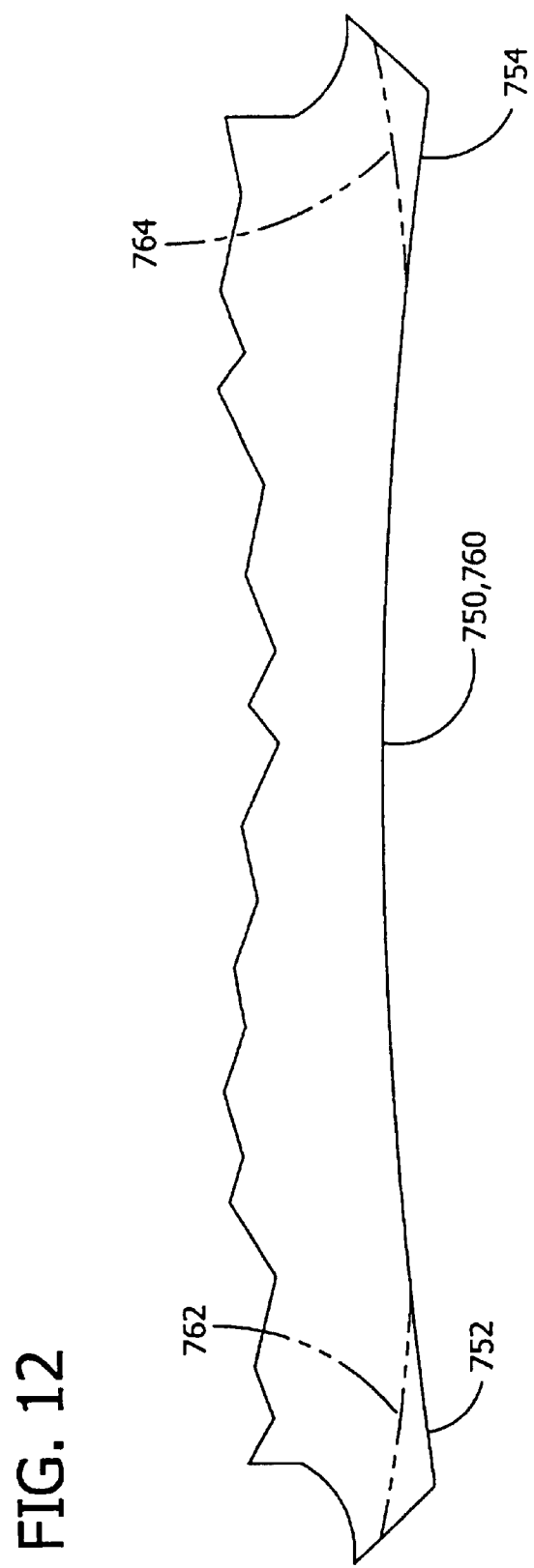
FIG. 12 illustrates preferred profiles for the magnet-bearing and non-magnet-bearing stator teeth of the machine of FIG. 11.
Figure 13A:
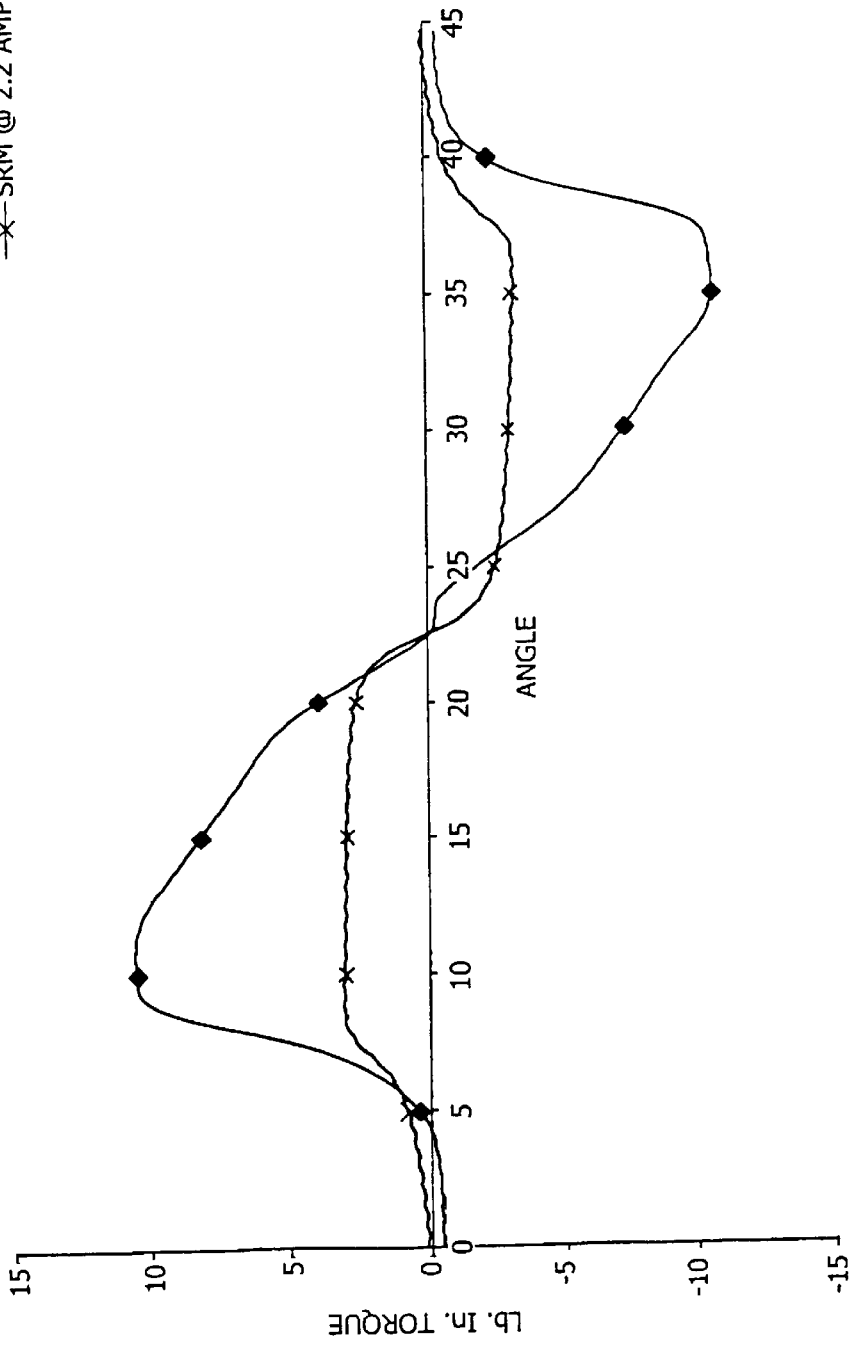
FIGS. 13A–D compare torque curves for the machine of FIG. 11 with those of a prior art switched reluctance motor.
Figure 13B:
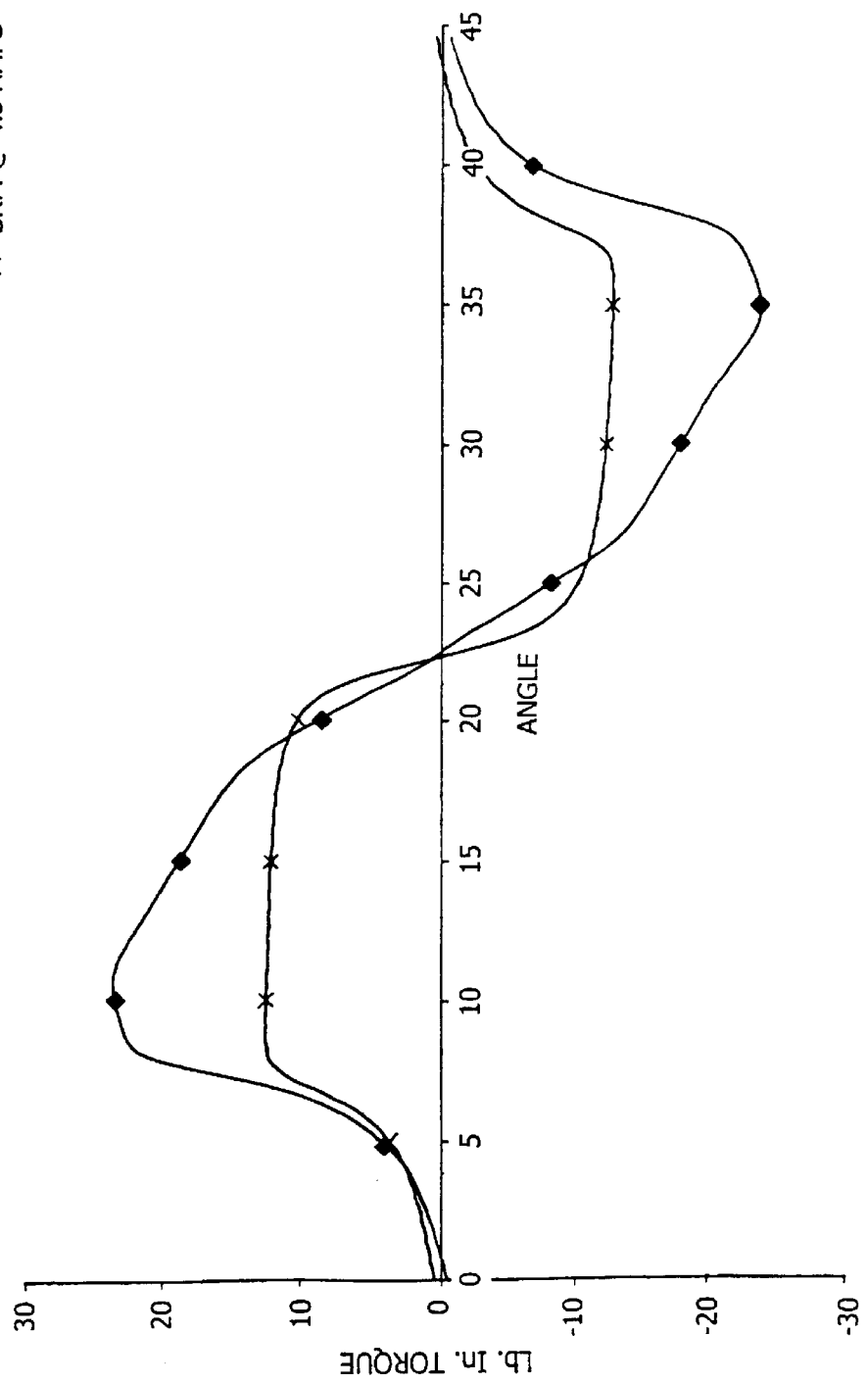
Figure 13C:
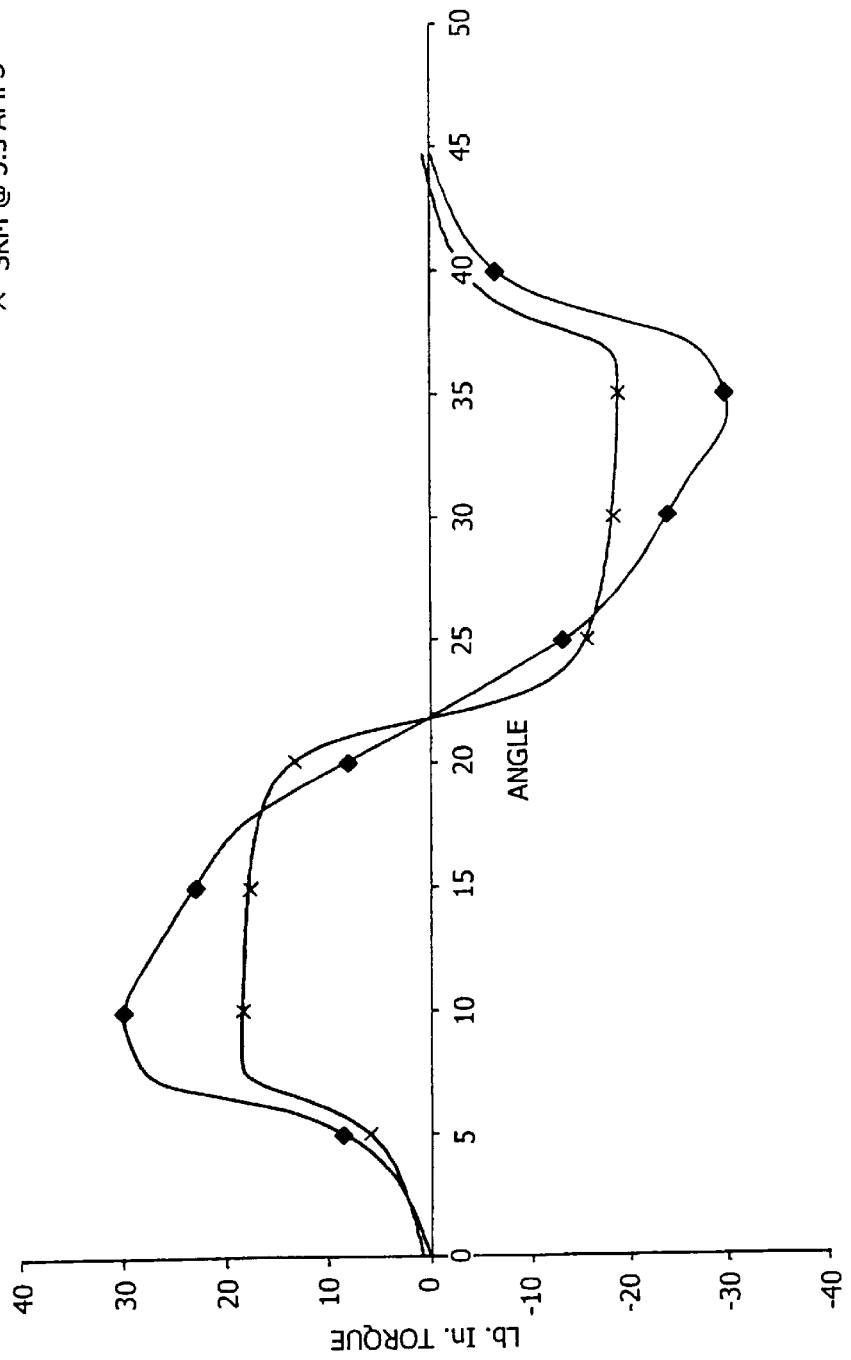
Figure 13D:
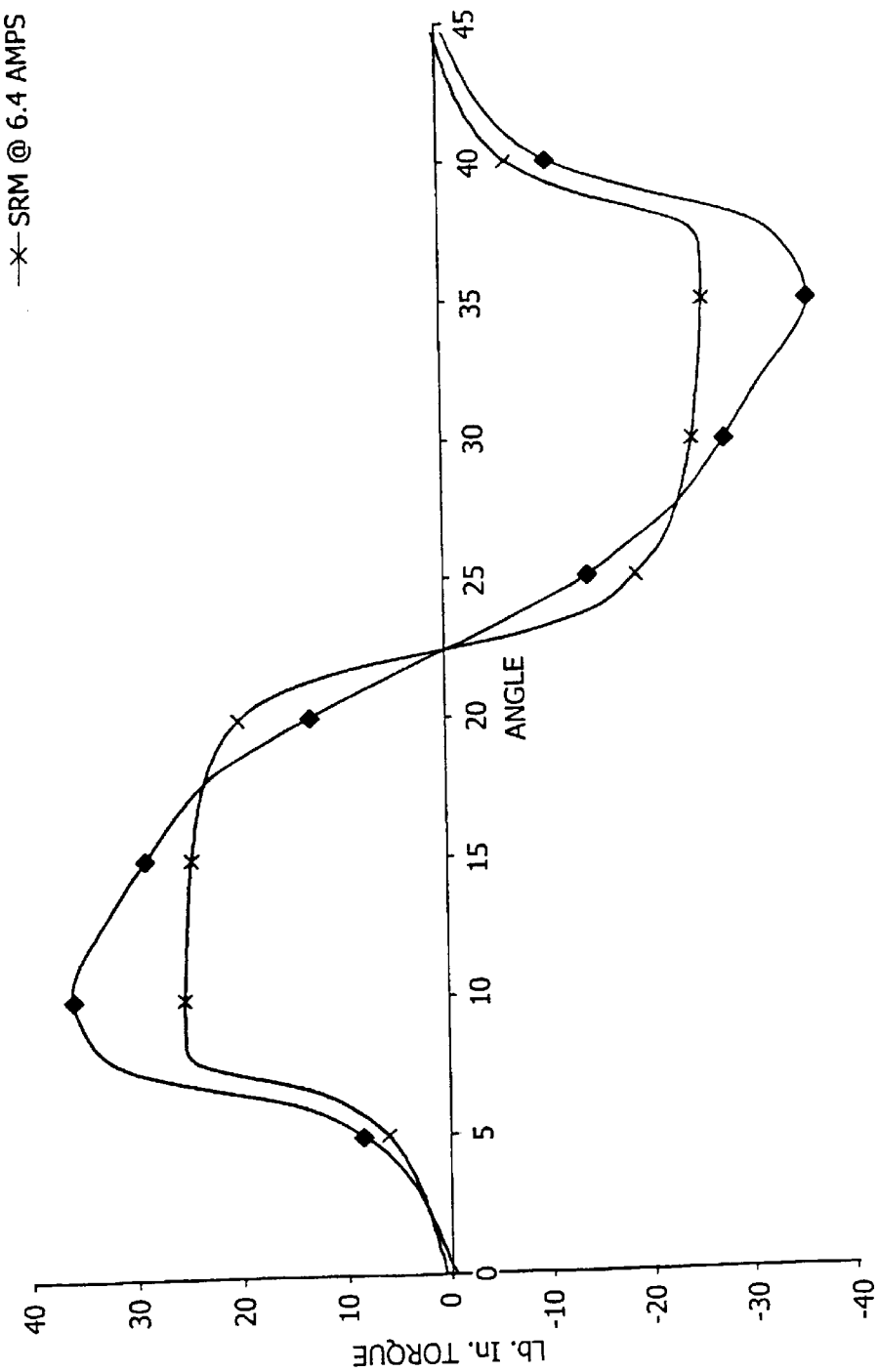

With further reference to FIG. 11, the magnet-bearing stator teeth 614, 618, 622, 626, 630, 634 and the non-magnet-bearing stator teeth 616, 620, 624, 628, 632, 636 are preferably shaped differently to further reduce noise. This is shown more clearly in FIG. 12, which depicts a profile 750 for one of the magnet-bearing stator teeth of FIG. 11 superimposed over a profile 760 (shown in phantom) for one of the non-magnet-bearing stator teeth of FIG. 11. As shown in FIG. 12, the profile 750 for the magnet-bearing stator teeth extends in a generally circumferential direction relative to the central axis 104, including along its end regions 752, 754. In contrast, the profile 760 for the non-magnet-bearing stator teeth has end regions 762, 764 which taper inwardly toward the inner peripheral edge 612. As a result, air gaps formed between the end regions 762, 764 of the non-magnet-bearing stator teeth and the rotor teeth are greater than air gaps formed between the end regions 752, 754 of the magnet-bearing stator teeth and the rotor teeth. As discovered by the inventor, this markedly reduces the acoustic noise generated by the machine 600. The non-magnet-bearing stator teeth in other embodiments of the invention, including those shown in FIGS. 4, 8, 9 and 10, may also embody end regions which taper inwardly toward the inner peripheral edge of the stator frame to a greater extent than do end regions of the magnet-bearing-stator teeth (if at all) so as to provide a different air gap profile, which reduces noise.

FIGS. 13A–D compare torque curves for the machine 600 of FIG. 11 and a comparably sized conventional switched reluctance motor when the motors are driven at unipolar currents of 2.2, 4.5, 5.5 and 6.4 amps, respectively. As shown in FIGS. 13A–D, the machine 600 of FIG. 11 produces significantly more torque at each current level. The machine 600 of FIG. 11 also has an improved torque density as compared to a conventional switched reluctance motor of comparable size, thus providing more torque for a given motor size, and an improved torque density for a given speed. Further, the machine of FIG. 11 (as well as other embodiments of the invention) has a wide speed range/constant power range. Accordingly, the teachings of the present invention are applicable to a substantial number of electric motor applications, including but not limited to those requiring wide speed ranges such as, e.g., electric vehicles.

Although not shown in FIGS. 4, 8 and 9–11, the magnet-bearing stator teeth shown therein each preferably employ a stator coil of the type shown in FIG. 6, and these coils are all preferably excited in such a manner as to align each coil with its corresponding magnet's polarity.

The exemplary embodiments of the invention described herein and shown in the drawings all employ block magnets, which are generally less expensive than, e.g., arc magnets. It should be understood, however, that a wide variety of magnets may be employed without departing from the scope of the invention. Further, while these exemplary embodiments all employ a stator having twelve salient stator poles/teeth and a rotor having eight salient rotor poles/teeth, the invention is not so limited, as will be apparent to those skilled in the art.

As noted above, the exemplary embodiments of the invention described herein can each be driven with unipolar currents, in contrast to bipolar currents such as those used in most brushless permanent magnet ("BPM") machines. With many embodiments of the invention, employing a unipolar drive ensures that the flow of current is always in a direction to assist the permanent magnets, thereby minimizing or eliminating demagnetization issues.

When introducing features of the present invention or the preferred embodiments thereof, the articles "a", "an", "the" and "said" are intended to mean that there are one or more such features. The terms "comprising", "including" and "having" are intended to be inclusive and mean that there may be additional features beyond those noted.

As various changes could be made in the above constructions without departing from the scope of the invention, it is intended that all matter contained in the above description or shown in the accompanying drawings shall be interpreted as illustrative and not in a limiting sense.

What is claimed is:

1. A stator for use in a permanent magnet machine, the stator comprising:
    a frame having an outer peripheral edge and an inner peripheral edge extending about a central axis;
    a plurality of stator teeth each extending along a radial axis from the frame's inner peripheral edge toward the central axis; and
    at least one permanent magnet located at least partly within one of the stator teeth;
    wherein said one permanent magnet has a pole surface oriented at an oblique angle relative to the radial axis along which said one of the stator teeth extends.

2. The stator of claim 1 wherein said one permanent magnet is located entirely within said one of the stator teeth, wherein said one permanent magnet and said one of the stator teeth each have a width extending in a direction of a rotor when the rotor is mounted for rotation about the central axis, and wherein the width of said one permanent magnet is greater than the width of said one of the stator teeth.

3. The stator of claim 1 wherein the frame includes a notch extending therein adjacent to said one of the stator teeth, and wherein a surface of the notch is contiguous to a surface of said one of the stator teeth.

4. The stator of claim 3 wherein said one of the stator teeth includes a short circuit region located between the notch and one end of said one permanent magnet.

5. The stator of claim 1 wherein the stator comprises a plurality of permanent magnets, wherein only every other one of the stator teeth has one of the permanent magnets located at least partly therein, and wherein each permanent magnet is oriented at an oblique angle relative to the radial axis along which its corresponding one of the stator teeth extends.

6. The stator of claim 5 wherein each of the stator teeth having one of the permanent magnets located at least partly therein has a first profile, and wherein each of the stator teeth having no permanent magnets located at least partly therein has a second profile different than the first profile.

7. The stator of claim 6 wherein the first and second profiles each include end regions facing the central axis, and wherein the second profile's end regions taper inwardly towards said inner peripheral edge to a greater extent than the first profile's end regions.

8. A permanent magnet machine comprising the stator of claim 1.

9. A stator for use in a permanent magnet machine, the stator comprising:
    a frame having an outer peripheral edge and an inner peripheral edge extending about a central axis;
    a plurality of permanent magnets each having inwardly facing north poles;
    a first plurality of stator teeth each extending along a radial axis from the frame's inner peripheral edge toward the central axis, each of the first plurality of stator teeth having one of the permanent magnets located at least partly therein; and
    a second plurality of stator teeth extending from the frame's inner peripheral edge toward the central axis, the second plurality of stator teeth each having no permanent magnets located therein;
    wherein the first plurality of stator teeth are each positioned directly between two of the second plurality of stator teeth;
    wherein the north poles of the permanent magnets are each oriented at an oblique angle relative to the radial axis along which its corresponding one of the stator teeth extends;
    wherein each permanent magnet and its corresponding one of the stator teeth have a width extending in a direction of rotation of a rotor when the rotor is mounted for rotation about the central axis; and
    wherein the width of each permanent magnet is greater than the width of its corresponding one of the stator teeth.

10. The stator of claim 9 wherein the first plurality of stator teeth each has a first profile, wherein the second plurality of stator teeth each has a second profile different than the first profile, wherein the first and second profiles each include end regions facing the central axis, and wherein the second profile's end regions taper inwardly towards said inner peripheral edge to a greater extent than the first profile's end regions.

11. The stator of claim 10 wherein the first plurality of stator teeth each has a first profile, wherein the second plurality of stator teeth each has a second profile different than the first profile, wherein the first and second profiles each include end regions facing the central axis, and wherein the second profile's end regions taper inwardly towards said inner peripheral edge to a greater extent than the first profile's end regions.

12. The stator of claim 10 wherein each of the first plurality of stator teeth has one of the permanent magnets located entirely therein.

13. A permanent magnet machine comprising the stator of claim 10 and a rotor mounted for rotation about the central axis, the rotor including a plurality of rotor teeth extending outwardly from the central axis.

14. The permanent magnet machine of claim 13 wherein the stator includes twelve stator teeth and the rotor includes eight rotor teeth.

* * * * *